United States Patent Office 3,033,725

Patented May 8, 1962

3,033,725

POWDERLESS ETCHING OF COPPER PLATE

Phillip M. Daugherty and Henry C. Vaughn, Atlanta, Ga., assignors to Photo-Engravers Research, Inc., Savannah, Ga., a corporation of Georgia No Drawing. Filed May 2, 1958, Ser. No. 732,419
3 Claims. (Cl. 156—14)

This invention relates to a new and improved method of etching the copper or copper-alloy surface of a plate or other body, for use in preparing an etched relief or intaglio printing plate or other etched printing body. The invention also includes a new and improved aqueous combination etching bath. This improved aqueous bath includes dissolved ferric chloride as an etching agent for etching selected parts of said copper or copper-alloy surface. This improved aqueous bath also contains one or more dissolved passivating agents, which passivate the copper or copper-alloy against the etching action of the ferric chloride.

Without limitation thereto, a passivating agent of the selected class is exemplified by formamidine disulfide hydrochloride, whose formula is $(CSN_2H_4)_2Cl_2$, also written as $C_2S_2N_4H_6$,2HCl. The formamidine disulfide group is $C_2S_2N_4H_6$. The molecular weight of said formamidine disulfide hydrochloride is substantially 194. This salt has a group as follows:

$$—C.S.S.\ddot{C}$$

Said formamidine disulfide hydrochloride is the highly preferred member of its class.

The manufacture of said formamidine disulfide hydrochloride and of other salts of formamidine disulfide is described in an article by Werner in the "Journal of The Chemical Society (London)," volume 101, pages 2166 to 2180.

Reference is made to "Chemistry of Carbon Compounds," volume 1, Part B, page 925, published in 1952 by Elsevier Publishing Company. As stated therein, if thiourea is oxidized with most oxidizing agents in the presence of acids, the reaction product is a salt of formamidine disulfide, $NH_2(NH:)C.S.S.C.(:NH)NH_2$.

The formula of formamidine disulfide hydrochloride is, $NH_2(NH:)C.S.S.C.(:NH)_2.2HCl$.

Whenever a salt of formamidine disulfide is mentioned, this includes a salt of a disulfide of a substituted formamidine, in which one or more hydrogen atoms of the formamidine group are substituted by an alkyl group or an aryl group, such as the diphenyl group, the dibutyl group, the diethyl group, and the diisopropyl group. As other examples of salts of formamidine disulfide which can be used as passivating agents, reference is made to formamidine disulfide hydroiodide, $C_2S_2N_4H_6.2HI$, which has a molecular weight of substantially 376; and formamidine disulfide picrate, $C_2S_4N_4H_6,2C_6H_3O_7N_3$, which has a molecular weight of substantially 580.

It is well known to apply a subject to the copper or copper-alloy surface of a plate or other body, by means of a resist medium which is resistant to etching action. This is part of the well-known process of photoengraving or other engraving process. The background between the lines or dots or areas of the resist medium is then removed by etching. This results in a relief printing plate or relief printing body.

Also, it is well known to use certain processes whereby the final printing member is an intaglio printing member.

In every case, one or more depressions must be etched in the copper or copper-alloy surface, by means of the aqueous solution of ferric chloride, and such depression or depressions must be provided with strong and clearly defined side-walls, in order to provide proper printing.

Heretofore, and for many years, it has been impossible to etch said depression or depressions to the required depth in a single, continuous etching process. Such single, continuous etching process weakened or undercut said side-walls, which resulted in defective printing. Hence, it was necessary to etch to the desired depth in several separated steps, using the well-known dragon's blood powder or other etch-resistant powder between these steps, in order to protect the side-walls against undercutting.

It has been proposed in Jones U.S. Patent No. 2,746,-848 to dissolve thiourea in conventional ferric chloride etching solutions, in order to diminish undercutting. However, practice has shown that the solutions disclosed in said Jones patent require ageing for at least thirty-six hours to have the desired effect. This requirement of ageing is a serious disadvantage. The use of aged thiourea is the subject of our co-pending application Ser. No. 162,969, filed December 28, 1961. The improved solutions disclosed herein require no ageing. In said improved solutions, the salt of the formamidine disulfide or of the substituted formamidine disulfide prevents or substantially prevents any etching action of the ferric chloride, by a passivating action. The dissolved passivating agent reacts with the copper or copper-alloy, either chemically or physically, possibly by adsorption, to provide a passivating film which must be removed, in order to exert the desired etching action by means of the dissolved ferric chloride. The passivating film can be easily removed at a room temperature of 20° C.–30° C., under normal atmospheric pressure of 760 millimeters of mercury, by gentle mechanical action. The passivating film may be removed by gentle brushing action, while the plate or other body is immersed in or is out of the etching solution or bath.

Much more preferably, the improved etching bath is impinged or directed against the surface to be etched, in the form of a jet or stream, in a direction which is perpendicular to the surface which is to be etched, or in a direction which is sufficiently close to the perpendicular direction. This jet or stream propulsion of the improved etching solution exerts a gentle but sufficient scrubbing or mechanical action to keep the bottom face of the etched depression either free from the passivating film, or sufficiently free to maintain the desired etching action at said bottom face. However, there is little or no removal of the passivating film from the side-walls of the depression. If the copper surface is merely immersed in the improved etching bath, at ordinary room temperature of 20° C.–30° C., at ordinary atmospheric pressure of 760 millimeters of mercury, without any relative movement between the immersed plate and the etching bath, and without agitating the etching bath, there is substantially no etching action.

Other objects and advantages of the invention will be set forth in part hereinafter and in part will be obvious therefrom, or may be learned by practice with the invention, the same being realized and attained by means of the combinations pointed out in the appended claims.

The solvent of the etching bath is preferably distilled water.

The specific gravity of the aqueous solution of ferric chloride in said distilled water may be in a range of 20° Baumé to 48° Baumé. This corresponds to adding anhydrous ferric chloride, in a range of 200 grams to 460 grams of anhydrous ferric chloride, per liter of water. The solution of the ferric chloride reacts in the usual manner with the copper to form water-soluble cuprous chloride.

A concentration in said solution of formamidine disulfide hydrochloride, of 0.6 gram per liter of said ferric chloride solution to 1.3 grams per liter of said ferric chloride solution, has been found satisfactory. In general, the weight of the formamidine disulfide hydrochloride may be in a range of 0.0025 to 0.006 mole per liter of the etching bath. Since the molecular weight of formamidine disulfide hydrochloride is approximately 194, this corresponds to substantially 0.4850 gram to substantially 1.164 grams of formamidine disulfide hydrochloride per liter of etching bath.

Substantially 250 grams to 450 grams of anhydrous ferric chloride may be dissolved per liter of distilled water, and substantially six-tenths (0.6) gram to three grams of formamidine disulfide hydrochloride may be dissolved per liter of said distilled water, in order to make the combined bath.

The concentration of the passivating agent or agents depends upon the concentration of the dissolved ferric chloride, and also upon the velocity at which the etching bath is impinged against the surface which is to be etched, also upon the temperature and upon the nature of the desired etching, such as coarse or fine engraving. A greater concentration of the ferric chloride and/or a greater velocity of impingement required a greater concentration of the passivating agent or agents. Thus, a plurality of the salts of formamidine disulfide or of the salts of a disulfide of a substituted formamidine may be used.

When the etching bath is impinged at 20° C.–30° C. upon a planar surface to be etched, in a direction substantially perpendicular to said surface, at a velocity of substantially 900 feet per minute, in air at normal atmospheric pressure of 760 millimeters of mercury, it is satisfactory as a good example, to use an aqueous etching bath in which 280 grams to 390 grams of anhydrous ferric chloride have been dissolved per liter of water and in which 0.6 gram to 1.3 grams of formamidine disulfide hydrochloride have been dissolved per liter of said etching bath. From these results, only routine testing is required if there is a variation in the concentration of the ferric chloride and/or the velocity of impingement, and/or the concentration of the passivating agent or agents and/or the working temperature.

In the following examples, a planar plate of copper of the kind used in photoengraving was coated with a suitable resist material as part of the well-known photo-engraving process, and the background part of the resist material of the subject was removed in the usual manner from the copper surface in order to expose the background part of the copper surface to etching by the aqueous solution of ferric chloride. In said examples, the passivating agent was formamidine disulfide hydrochloride. The etching was done in a single, continuous step at ordinary room temperature of 20° C.–30° C. The etching bath was used immediately after it was prepared. The plate was held in an atmosphere of air, which was to be etched in a direction perpendicular to said surface, in order to form etched depressions whose inner faces were perpendicular to said direction, said etched depressions having side walls parallel to said impingement direction.

*Example 1*

The etching bath of ferric aqueous chloride had a specific gravity of 40 Baumé. This solution was made by dissolving 370 grams of anhydrous ferric chloride per liter of distilled water. This etching solution was supplemented by dissolving one gram of formamidine disulfide hydrochloride per liter of said solution of ferric chloride. This combined solution or combined etching bath could be used, immediately after being prepared. This combined solution or etching bath was splashed against the planar surface of the plate, at a velocity of substantially 900 feet per minute, in a direction substantially perpendicular to said planar surface.

The etching period was continuous during a period of ten minutes. At the end of said period of ten minutes, there was a clean, even etch to a depth of substantially seven-thousandths (0.007) of an inch. This etching resulted in a relief printing plate, with no signs of undercutting.

*Example 2*

The same etching bath and a duplicate plate were used as in Example 1, and all other conditions of Example 1 were followed, save that a liquid stream of the etching bath was propelled at the rate of substantially 900 feet per minute, in a direction substantially perpendicular to the planar surface which was to be etched.

This required a continuous, single-step etching period of only three minutes. The depth of the etching was substantially twenty-five ten-thousandths of an inch (0.0025 inch). As in Example 1, there was no observable undercutting.

By using one or more of the passivating agents, it is thus possible to produce etched relief lines, dots or other areas which have clean bottom faces; and clean and strong side walls which are substantially free from undercutting, and which have strong shoulders.

Since no ageing of the combination etching bath is required, and since the dragon's blood process is made unnecesasry, it is possible to use the improved fresh etching bath with great economy of time and labor.

As one example, the copper surface which is to be etched is planar, and the combination etching bath is impinged or splashed upon said copper surface, in a direction which is perpendicular or substantially perpendicular to the plane of said copper surface. The planar copper surface may be maintained in air, spaced from the etching bath in a horizontal or vertical plane during the etching operation.

The etching bath may be impinged or splashed upon the copper surface by means of a rotary paddle wheel, whose circular periphery is provided with diametrically opposed pairs of planar paddles or blades, which are of rectangular shape. This wheel is rotated about a horizontal axis, and it may be provided with a guard to cause it to splash or impinge the liquid in substantially a single direction. This direction is vertically upward, if the planar copper surface is held in a horizontal plane close to and above the uppermost non-immersed blade. This direction is horizontal, if the planar copper surface is held in a vertical plane close to and adjacent the respective pair of non-immersed blades. As one example, the paddle wheel is rotated 400 to 500 revolutions per minute, and the diametral distance between the outer edges of each pair of diametrically opposed blades is seven to eight inches. Each pair of adjacent blades forms a pocket which picks up a batch of the etching bath and propels said batch in the selected vertical or horizontal direction by centrifugal force.

Any suitable pump and nozzle can be used in order to propel a jet of the etching bath in the selected direction, which is either perpendicular or substantially perpendicular to the copper surface.

As above noted, the solution of ferric chloride, if used in the absence of the dissolved passivating agent or agents, will react in situ with the copper of the copper surface to form water-soluble cuprous chloride. However, if the ferric chloride is used in combination with a suitable concentration of the passivating salt or salts, in the absence of relative movement between the copper surface and the combined etching bath, the film of water-soluble copper chloride reacts in situ with the passivating salt or salts, thus preventing any further etching removal of the copper by the etching bath.

The three factors of concentration of the ferric chloride, the concentration of the passivating salt or salts, and the velocity of relative movement between the copper surface and the etching bath, are therefore easily determined by routine tests. Although the stabilizing salts have been disclosed in said article by Werner, it is believed that they have not heretofore been put to any practical use.

The invention is further disclosed and is also defined in the appended claims, without limitation to the details mentioned herein.

What is claimed is:

1. In a process for the etching of photoengraving copper having a portion of its surface masked with a resistant coating, the etching being by contacting the photoengraving copper with ferric chloride etching solution, the improvement which comprises adding to the ferric chloride solution a film-former selected from the group consisting of salts of formamidine disulfide and salts of substituted formamidine disulfide, and contacting the unmasked surface of the photoengraving copper with said etching solution.

2. The process of claim 1 wherein the film-former mixed with ferric chloride solution is a salt of formamidine disulfide.

3. The method of claim 2, in which the bath includes ferric chloride in a range of substantially 200 to 460 grams per liter of the bath and the salt of formamidine disulfide is formamidine disulfide hydrochloride and the salt is added to the bath in an amount sufficient to provide therein a formamidine disulfide hydrochloride concentration of substantially 0.6–3 grams per liter.

References Cited in the file of this patent

UNITED STATES PATENTS

| | | |
|---|---|---|
| 2,684,892 | Saulnier | July 27, 1954 |
| 2,746,848 | Jones | May 22, 1956 |

OTHER REFERENCES

Whitmore Organic Chemistry, publ., 1937, by Van Nostrand, p. 534.